O. A. BRICTSON.
PROTECTOR FOR PNEUMATIC TIRES.
APPLICATION FILED APR. 11, 1907.
971,246.
Patented Sept. 27, 1910.
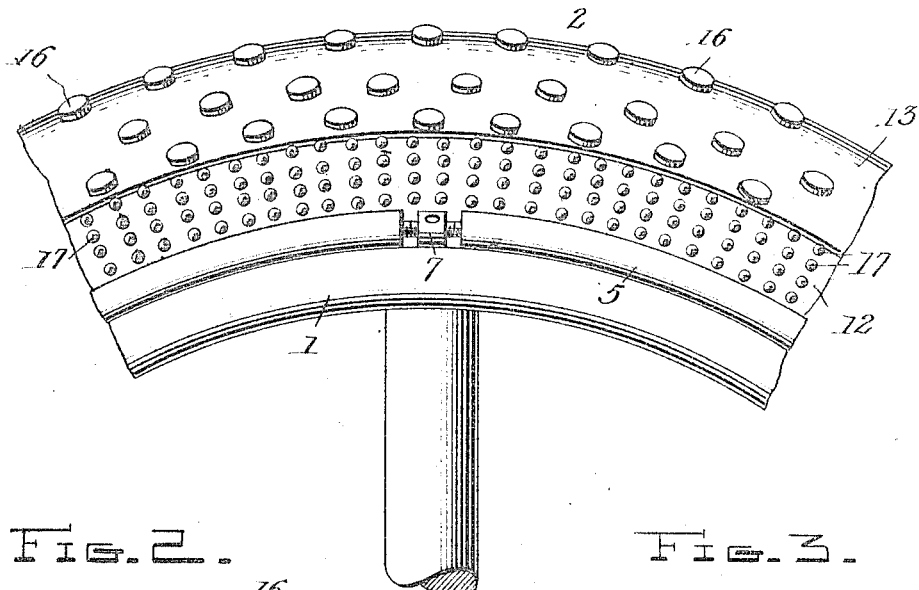
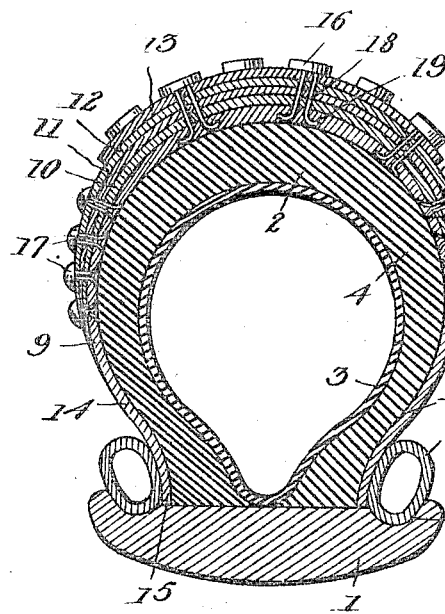
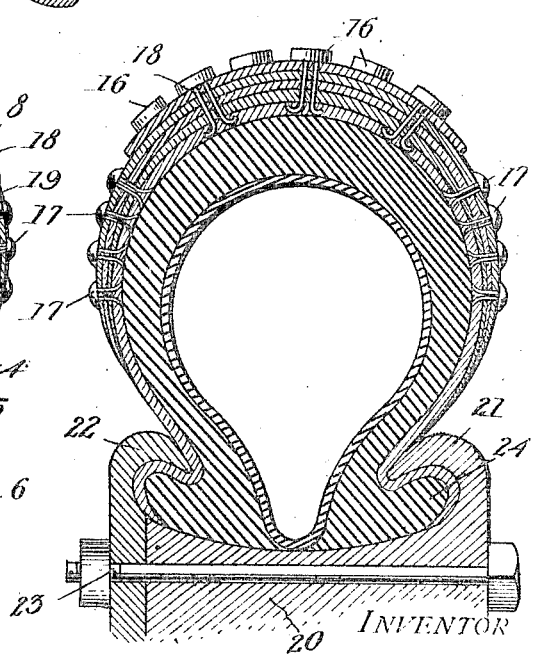
WITNESSES:
INVENTOR
O. A. Brictson
BY Watson E. Coleman
Attorney

UNITED STATES PATENT OFFICE.

OLE A. BRICTSON, OF BROOKINGS, SOUTH DAKOTA.

PROTECTOR FOR PNEUMATIC TIRES.

971,246.

Specification of Letters Patent. Patented Sept. 27, 1910.

Application filed April 11, 1907. Serial No. 367,637.

*To all whom it may concern:*

Be it known that I, OLE A. BRICTSON, a citizen of the United States, residing at Brookings, in the county of Brookings and State of South Dakota, have invented certain new and useful Improvements in Protectors for Pneumatic Tires, of which the following is a specification, reference being had therein to the accompanying drawing.

My invention relates to improvements in protective coverings for pneumatic tires and consists in the novel features of construction, combination and arrangement of parts hereinafter described and claimed.

One object of the invention is to provide a device of this character which will be of simple, strong, durable and comparatively inexpensive construction and which may be quickly and easily applied to and removed from the tire.

Another object of the invention is to provide a tire protector of this character which will entirely surround the exposed portion of the tire so as to protect the same from rim cuts, chafing, and blow-outs and prevent water, mud and dust from coming in contact with the tire.

Another object of the invention is to provide a tire protector of this character with means whereby its sides will be protected as well as its tread portion.

The above and other objects are accomplished by the improved construction illustrated in the accompanying drawings, in which—

Figure 1 is a side elevation of a portion of a wheel, showing my improved protector applied to its tire; Fig. 2 is a cross section through the same; and Fig. 3 is a view similar to Fig. 2, showing the protector applied to a different form of wheel rim.

Referring more particularly to Figs. 1 and 2, 1 denotes a portion of a rim of an automobile or other vehicle wheel, 2 the pneumatic tire consisting of an inner tube 3 and an outer tube or casing 4, and 5 denotes two tire retaining bands or hoops which are seated in grooves 6 in the rim 1 and are provided with the usual turn buckles 7 for drawing their ends together. These hoops or bands 5 are arranged upon the opposite sides of the tire and when the latter is inflated serve to retain the tire upon the rim and also my improved tire protector 8 upon the tire.

The protector 8 is detachable and made to cover the entire exposed portion of the tire. It is preferably composed of an endless inner layer 9 of leather, two layers or thicknesses 10, 11 of canvas, an outer layer 12 of leather and a tread portion or layer 13 also of leather. The inner layer 9 is shaped to fit the tire and is endless, its two edges 14 are of such length that they will fit between the outer faces of the outer tube or casing 4 of the tire and the retaining bands of hoops 5, as clearly shown at 15 in Fig. 2, in order that when the tire is inflated they will be effectively clamped between said parts and the protector will thus be securely retained upon the tire. The provision of these continuous flanges or portions 14 of the protector prevents water, mud, dust and the like from coming in contact with the tire and hence effectively protects the same. The layer of canvas 10, 11 and the outer leather layer 12 are of such width that they extend over the sides of the tire, while the leather layer 13 is only of sufficient width to cover the tread of the tire. These layers 10, 11, 12, 13 are secured to the inner layer 14 by two sets of double pointed internally clenched rivets 16, 17. Those of the set 16 are arranged over the tread portion 13 and have large flat heads forming gripping and protecting elements, while those of the set 17 are arranged upon each side of the tread portion 13 and are somewhat smaller and much more closely arranged or clustered. The rivets 17, it will be seen, hold the edges of the layers 10, 11, 12 down upon the inner layer and serve to effectively protect the sides of the protector from being cut by ruts in the road or by contact with the curbs of streets, etc. Each of said rivets 16, 17 have two prongs 18 which extend through the several layers of the protector and have their inner ends 19 bent outwardly or clenched in the inner leather layer 9, as clearly shown in Fig. 2.

In Fig. 3 I have shown the protector applied to a clencher rim of well known form consisting of a body portion 20 having a stationary flange 21 upon one side and a removable flange or ring 22 upon its other side. This detachable ring 22 may be held in position by bolts 23 or any other suitable means. The edges of the outer tube of the tire have projecting ribs 24 for engagement with the flanges 21, 22 and the inner leather layer of the protector is adapted to have its edges folded over the ribs or flanges 24 for the purpose of effectively retaining the protector upon the tire.

From the foregoing it will be seen that the protector may be readily applied to or removed from the tire. When it is desired to apply it, it is only necessary to place it over the outer tube or casing and engage its flanges 14 with the edges or flanges of said tube. When thus applied, the tire is placed upon the rim and the hoops 5 or the ring 22 then adjusted, as shown in Figs. 2 and 3, so that the flanges 14 will be clamped in position with the tire. By reason of this construction no metallic hooks or other fastening devices are necessary for retaining the protector in position. The rivets 17 upon each side of the protector serve to effectively protect its side portions from wear and also to effectively secure the edges of the outer layers of the protector upon its inner one.

Having thus described my invention what I claim and desire to secure by Letters Patent is:—

A pneumatic tire having an outer protecting covering composed of layers of material, annular rows of rivets connecting the tread portion of the layers and arranged in staggered relation, said rivets having outer enlarged flattened heads disposed out of transverse alinement and on lines between each other, an annular series of rivets connecting the layers at each side of the tire and between the tread portion of the tire and rim of the wheel, said rivets having outer rounded heads of smaller diameter than the heads of the tread rivets, said round headed rivets being arranged in alined longitudinal and transverse rows in close relation to each other so as to form clusters of projections to protect the sides of the tire and layers from wear.

In testimony whereof I hereunto affix my signature in presence of two witnesses.

OLE A. BRICTSON.

Witnesses:
ROBERT A. STORM,
NEIL STEWART.